UNITED STATES PATENT OFFICE 1,949,142

AZO-DYESTUFFS

Gérald Bonhôte and Carl Apotheker, Basel, Switzerland, assignors to Society of Chemical Industry in Basle, Basel, Switzerland No Drawing. Application July 8, 1933, Serial No. 679,578. In Switzerland July 13, 1932

4 Claims. (Cl. 260—95)

According to this invention new dyestuffs are made by coupling an arylide of 2:3-hydroxy-naphthoic acid with a diazo- or poly-azo-compound derived from a base of the general formula

in which $R_1$, $R_2$ and $R_3$ may be any aryl residues, at least one of which contains a diazotizable amino-group, and which may contain various substituents.

The dyestuffs thus obtained which correspond with the general formula

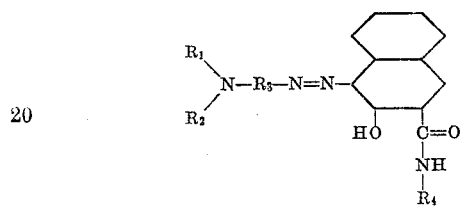

wherein $R_1$, $R_2$, $R_3$ and $R_4$ stand for aromatic nuclei of the benzene or naphthalene series, are dark powders applicable for coloring varnishes, lacquers or for use as pigments. They dissolve in organic solvents, for example pyridine or glacial acetic acid, to red to Bordeaux, violet, blue, green and black solutions. Particularly valuable dyeings are obtained when the new dyestuffs are produced on the fiber in known manner. The Bordeaux to violet, blue, green and black dyeings thus produced are characterized by their fullness and their properties of fastness.

The following examples illustrate the invention:—

Example 1

26 parts by weight of para-aminotriphenylamine are diazotized in the usual manner. The solution thus obtained is introduced, if necessary after filtration, into one of 26.3 parts of 2:3-hydroxynaphthoic acid-anilide, 50 parts of caustic soda solution of 30 per cent. strength, 50 parts of calcined sodium carbonate and 2000 parts of water. The dyestuff thus formed of the formula

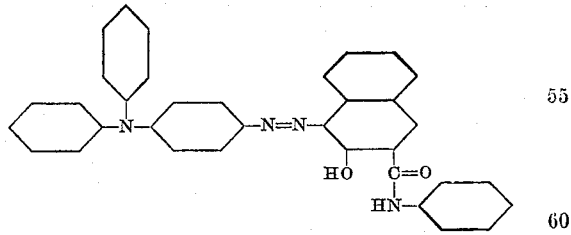

is a blue precipitate which is filtered, washed and dried.

Example 2

Cotton yarn is impregnated with a grounding made by dissolving 5.5 grams of 2.3-hydroxy-naphthoic acid-para-chloranilide in 300 cc. of hot water with addition of 11 cc. of caustic soda solution of 30 per cent, strength and 8 cc. or Turkey red oil, the whole being then diluted to 1 liter. The goods are then wrung out and developed in a neutralized solution containing 2.5 grams per liter of diazotized para-aminotriphenylamine. In this manner there is obtained a pure greenish-blue dyeing of very good properties of fastness.

Similar results are obtained in the dyeing or printing of piece-goods.

If it is desired to produce the dyestuffs of this invention on wool, it is advantageous to use such baths which contain at least 1 gram of sodium hydroxide in the liter and containing 1.5 to 3 per cent. of the arylide calculated on the weight of the wool.

Example 3

10 grams of cotton yarn are impregnated in 250 cc. of a bath containing 7 grams of 2:3- hydroxynaphthoic acid-2'-methylanilide, 14 cc. of caustic soda solution of 30 per cent. strength, 10 cc. of Turkey red oil and 7 cc. of formaldehyde solution per liter, the temperature of the solution being 25–30° C.; the goods are well wrung out and then developed in a neutralized solution containing per liter 2 grams of diazotized 4-amino-4':4''-dimethoxy-triphenylamine (which can be made, like other substituted 4-amino-triphenylamines, by condensing 4:4'-dimethoxy-diphenylamine-ortho-carboxylic acid (which may itself be obtained by condensation of para-anisidine with 1-chloro-4-methoxybenzene-2-carboxylic acid) with para-nitrochlorobenzene with simultaneous elimination of the carboxyl group and reduction of the nitro-compound. The goods are then rinsed and soaped; the dyeing obtained is a very pure blue of very good properties of fastness. The new dyestuff corresponds very probably with the formula

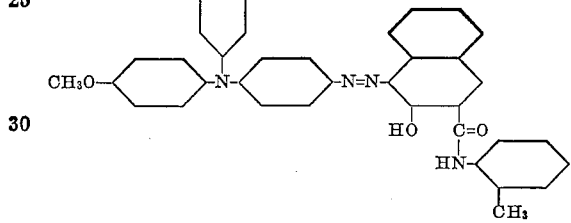

Example 4

The material to be printed is foularded with an alkaline solution containing per liter 12 grams of 2:3-hydroxy-naphthoic acid-3'-nitranilide. After drying, the material is treated with a printing color containing per kilo 8 grams of diazotized 4 - amino - 2':5':4'' - trimethoxytriphenylamine. The deep, pure blue dyeing develops very quickly and is very fast. The new dyestuff corresponds very probably with the formula

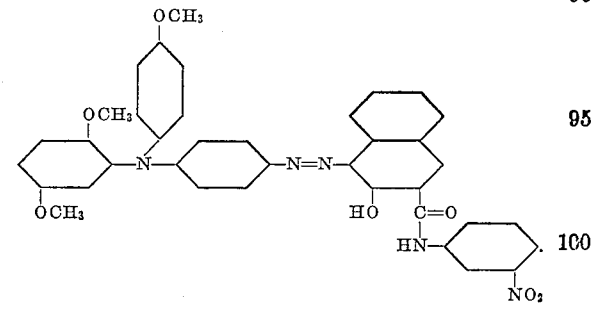

The following table sets forth a number of dyestuffs which may be made in accordance with this invention:—

| | Diazo component | Coupling component | Color tint |
|---|---|---|---|
| 1. | 4-aminotriphenylamine | 2:3-hydroxynaphthoic acid-anilide | Red blue. |
| 2. | 4'-methyl-4-aminotriphenylamine | 2:3-hydroxynaphthoic acid-3'-chloranilide | Blue. |
| 3. | 2'-methyl-4-aminotriphenylamine | 2:3-hydroxynaphthoic acid-3'-nitranilide | Blue. |
| 4. | 4'-chloro-4-aminotriphenylamine | 2:3-hydroxynaphthoic acid-2':4'-dimethylanilide | Violet. |
| 5. | 2'-chloro-4-aminotriphenylamine | 2:3-hydroxynaphthoic acid-2'-ethoxyanilide | Violet. |
| 6. | 4'-methoxy-4-aminotriphenylamine | 2:3-hydroxynaphthoic acid-3'-nitranilide | Green blue. |
| 7. | 2'-methoxy-4-aminotriphenylamine | 2:3-hydroxynaphthoic acid-1'-naphthylamide | Red blue. |
| 8. | 4'-ethoxy-4-aminotriphenylamine | 2:3-hydroxynaphthoic acid-2'-methylanilide | Blue. |
| 9. | 2'-ethoxy-4-aminotriphenylamine | 2:3-hydroxynaphthoic acid-3':4'-dichloranilide | Blue. |
| 10. | 2'-methyl-4'-chloro-4-aminotriphenylamine | 2:3-hydroxynaphthoic acid-2'-methoxyanilide | Violet. |
| 11. | 2'-methoxy-4'-chloro-4-aminotriphenylamine | 2:3-hydroxynaphthoic acid-3'-nitranilide | Red blue. |
| 12. | 2':4'-dimethyl-4-aminotriphenylamine | 2:3-hydroxynaphthoic acid-4'-chloro-2'-toluidide | Blue. |
| 13. | 2':5'-dichloro-4-aminotriphenylamine | 2:3-hydroxynaphthoic acid-2':5'-dimethoxyanilide | Violet. |
| 14. | 2':5'-dimethoxy-4-aminotriphenylamine | 2:3-hydroxynaphthoic acid-2'-methoxy-5'-toluidide | Red blue. |
| 15. | 2':5'-diethoxy-4-aminotriphenylamine | 2:3-hydroxynaphthoic acid-3'-chloranilide | Blue. |
| 16. | 4':4''-dimethoxy-4-aminotriphenylamine | 2:3-hydroxynaphthoic acid-3'-nitranilide | Green blue. |
| 17. | 4':4''-diethoxy-4-aminotriphenylamine | 2:3-hydroxynaphthoic acid-5'-chloro-2'-toluidide | Blue. |
| 18. | 2':5':4''-trimethoxy-4-aminotriphenylamine | 2:3-hydroxynaphthoic acid-3'-chloranilide | Red blue. |
| 19. | N(1-naphthyl)-4-aminodiphenylamine | 2:3-hydroxynaphthoic acid-3'-methylanilide | Red blue. |
| 20. | N(2-naphthyl)-4-aminodiphenylamine | 2:3-hydroxynaphthoic acid-2':5'-dimethylanilide | Red Blue. |
| 21. | 4'-aminotriphenylamine-2-carboxylic acid-ethylester | 2:3-hydroxynaphthoic acid-3':4'-dichloranilide | Red Blue. |
| 22. | 2'' - methyl - 4' - aminotriphenylamine - 2 - carboxylic acid-ethylester. | 2:3-hydroxynaphthoic acid-3'-4'-dichloranilide | Red Blue. |
| 23. | 4''-methyl-4'-aminotriphenylamine-2-carboxylic acid-ethylester. | 2:3-hydroxynaphthoic acid-3'-nitranilide | Blue. |
| 24. | 2''-chloro-4'-aminotriphenylamine-2-carboxylic acid-ethylester. | 2:3-hydroxynaphthoic acid-4'-methoxyanilide | Violet. |
| 25. | 4''-chloro-4'-aminotriphenylamine-2-carboxylic acid-ethylester. | 2:3 hydroxynaphthoic acid-4'-chloranilide | Violet. |
| 26. | 2''-methoxy-4'-aminotriphenylamine-2-carboxylic acid-ethylester. | 2:3-hydroxynaphthoic acid-1'-naphthylamide | Red Blue |
| 27. | 4''-methoxy-4'-aminotriphenylamine-2-carboxylic acid-ethylester. | 2:3-hydroxynaphthoic acid-3'-nitranilide | Blue. |
| 28. | 4''-ethoxy-4'-aminotriphenylamine-2-carboxylic acid-ethylester. | 2:3-hydroxynaphthoic acid-4'-chloro-2'-toluidide | Red Blue. |
| 29. | 2'':4''-dimethyl-4'-aminotriphenylamine-2-carboxylic acid-ethylester. | 2:3 hydroxynaphthoic acid-3'-nitranilide | Blue. |
| 30. | 2'':5''-dichloro-4'-aminotriphenylamine-2-carboxylic acid-ethylester. | 2:3-hydroxynaphthoic acid-2'-naphthylamide | Violet. |
| 31. | 2''-methoxy-4''-chloro-4'-aminotriphenylamine-2-carboxylic acid-ethylester. | 2:3-hydroxynaphthoic acid-3':4'-dichloranilide | Red Blue. |
| 32. | N(1-naphthyl)-4''-aminodiphenylamine-2-carboxylic acid-ethylester. | 2:3-hydroxynaphthoic acid-4'-methoxyanilide | Red Blue. |
| 33. | 2''-methyl-4''-chloro-4'-aminotriphenylamine-2-carboxylic acid-ethylester. | 2:3-hydroxynaphthoic acid-2':5'-dimethylanilide | Red blue. |
| 34. | N(2-naphthyl)-4'-aminodiphenylamine-2-carboxylic acid-ethylester. | 2:3-hydroxynaphthoic acid-3'-chloranilide | Red blue. |
| 35. | 4'-amino-triphenylamine-2-carboxylic acid-anilide | 2:3-hydroxynaphthoic acid-2'-naphthylamide | Red blue. |
| 36. | 4''-chloro-4'-aminotriphenylamine-2-carboxylic acid-anilide | 2:3-hydroxynaphthoic acid-2'-ethoxy-5'-toluidide | Violet. |
| 37. | 4''-methyl-4'-aminotriphenylamine-2-carboxylic acid-anilide | 2:3-hydroxynaphthoic acid-2'-chloro-5'-toluidide | Red blue. |
| 38. | 2''-methyl-4'-aminotriphenylamine-2-carboxylic acid-anilide | 2:3-hydroxynaphthoic acid-3'-nitranilide | Red blue. |
| 39. | 2-aminotriphenylamine | 2:3-hydroxynaphthoic acid-anilide | Bordeaux. |
| 40. | 4'-methoxy-2-aminotriphenylamine | 2:3-hydroxynaphthoic acid-4'-chloranilide | Bordeaux. |

The formula of dyestuff 19 is very probably:—

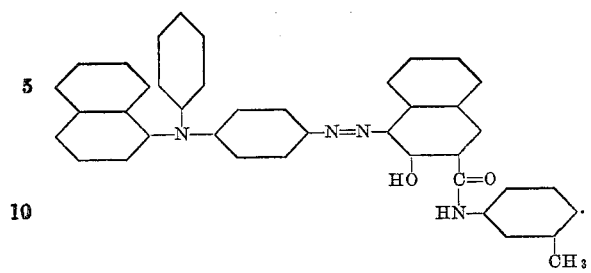

The formula of dyestuff 40 is very probably:—

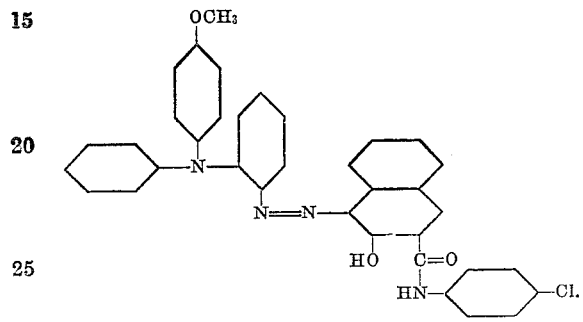

What we claim is:—
1. The azo-dyestuffs of the general formula

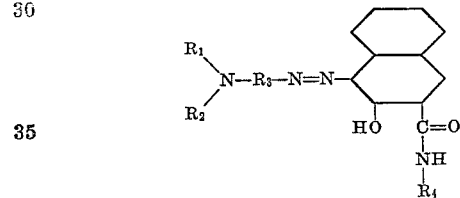

wherein $R_1$, $R_2$, $R_3$ and $R_4$ stand for aromatic nuclei of the benzene or naphthalene series, which dyestuffs form dark powders dissolving in organic solvents to blue-red to violet, blue and black solutions, and, when produced on the fiber, especially cotton fiber, dye the same fast red to Bordeaux, violet, blue, green and black tints.

2. The azo-dyestuffs of the general formula

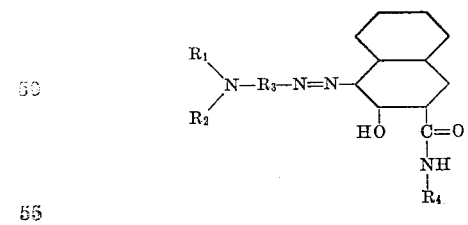

wherein $R_1$, $R_2$ and $R_3$ stand for aromatic nuclei of the benzene series, and $R_4$ stands for an aromatic nucleus of the benzene or naphthalene series, which dyestuffs form dark powders dissolving in organic solvents to blue-red to violet, blue and black solutions, and, when produced on the fiber, especially cotton fiber, dye the same fast red to Bordeaux, violet, blue, green and black tints.

3. The azo-dyestuffs of the general formula

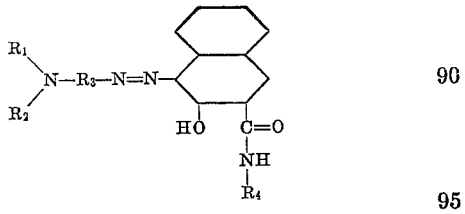

wherein $R_1$ and $R_2$ stand for benzene nuclei containing alkoxy groups, $R_3$ stands for an aromatic nucleus of the benzene series, and $R_4$ for an aromatic nucleus of the benzene or naphthalene series, which dyestuffs form dark powders dissolving in organic solvents to violet to blue and green-blue solutions, and, when produced on the fiber, especially cotton fiber, dye the same fast violet to blue and green-blue tints.

4. The azo-dyestuffs of the general formula

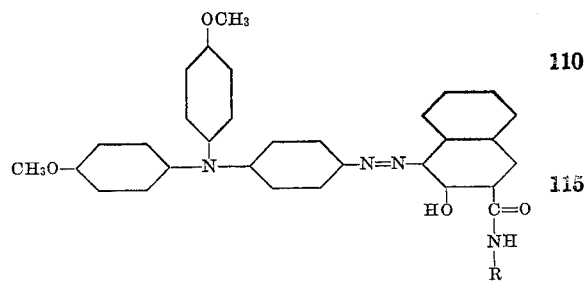

wherein R stands for an aromatic nucleus of the benzene or naphthalene series, which dyestuffs form dark powders dissolving in organic solvents to violet to blue solutions, and, when produced on textiles, especially cotton, dye the same fast blue to green-blue tints.

GÉRALD BONHÔTE.
CARL APOTHEKER.